United States Patent [19]

Jones

[11] Patent Number: 4,842,304

[45] Date of Patent: Jun. 27, 1989

[54] SERVICE LOCATOR

[76] Inventor: Alvin K. Jones, 37115 Immigrant Rd., Pleasant Hill, Oreg. 97455

[21] Appl. No.: 115,513

[22] Filed: Nov. 2, 1987

[51] Int. Cl.[4] .......................... B42F 13/02; G09C 1/06; B42D 15/00; G03C 1/92

[52] U.S. Cl. .......................................... 283/81; 283/74; 283/91; 430/338

[58] Field of Search .............................. 283/74, 81, 91; 156/DIG. 23; 430/338; 40/20 R

[56] References Cited

U.S. PATENT DOCUMENTS

| | | | |
|---|---|---|---|
| 842,348 | 1/1907 | Shiley | 283/81 |
| 1,258,081 | 3/1918 | Albree | 283/74 |
| 1,535,536 | 4/1925 | MacDonald | 283/74 |
| 2,530,888 | 11/1950 | Marchelewicz . | |
| 2,599,472 | 6/1952 | Miller . | |
| 2,680,497 | 6/1954 | Miller . | |
| 3,116,148 | 12/1963 | Miller | 430/338 |
| 3,147,824 | 9/1964 | Henderson . | |
| 4,436,377 | 3/1984 | Miller | 283/91 |
| 4,453,618 | 6/1984 | Economaki . | |
| 4,718,697 | 1/1988 | Van Amelsfort | 283/74 |

*Primary Examiner*—Donald R. Schran
*Assistant Examiner*—Paul M. Heyrana, Sr.

[57] ABSTRACT

A tag for locating, color coding, numbering, and or supplying other information at service points. Said tag composed of locator tag body (12) with attachment hole (10). The tag body (12) being composed of an elastic material that will allow attachment hole (16) to be stretched over lubricant fitting neck (24) of lubricant fitting (18). A color indicia coding (14) may be within the material of the locator tag body (14) or printed or laminated on its surfaces. Numbers, symbols, maintenance information, etc., may be displayed on locator tag bodys (12) information area (16).

5 Claims, 1 Drawing Sheet

SERVICE LOCATOR

BACKGROUND

1. Field of Invention

This invention relates to servicing machinery. Specifically to an improved method of marking/coding service points on machinery so that they may be more easily found and distinguished from each other. In addition a way of providing needed service information next to service points such as lubricant types, amounts and so on. Most importantly a way of marking/coding service points that will help prevent the oversight of any one service point.

2. Description of Prior Art

Heretofore, lubricant fittings and other service points are most often not marked or coded. Although there are a number of devices that perform this function.

One such device (Gang of Grease Fitting Covers) Lubricant fitting caps may be supplied in various colors so that a different color may be used for each servicing of a grease fitting.

Another device (Grease Fitting Cover and Locator) an indicia surface device may be placed on its flange to enhance the visibility of the identification thereof. Means are provided for placing an identifying tag on the flange if needed.

These, and other prior arts uncovered function primarily as protective covers for lubricant fittings. These covers must be removed before servicing, thus, misplacing them is likely. As a result, a service point without its cover may be overlooked during subsequent service intervals. Oversights may cause premature breakdowns that at times bring entire production lines to a stand still. Because these devices are first a lubricant fitting cover and then a locator, their effect as an information device is restricted by their physical shape and size.

Most users, therefore, would find it desirable to have an information device that is permanent (not removed during service) that provides a large area for information and visibility.

OBJECTS AND ADVANTAGES

The main purpose is to prevent oversights of service points and to assure accurate service procedures.

Accordingly, several objects and advantages of the invention are a permanent tag for service points. Said tag is not to be removed during servicing. Thus freeing an extra hand of the service person and most importantly assuring tag will remain in its proper place, along with the information it supports. The tag may be large enough to display information to the service person from a great distance.

This information could be color coding, sequential numbering, lettering, lubrication types, amounts, or any other information that could be of help to the service person. By following sequentially numbered tags, the service person will develop a standard procedure of preforming the service work and he will know when the next consecutively numbered service point is not found.

Further objects and advantages of the invention will become apparent from consideration of the drawings and the ensuing description of it.

Figure 1:
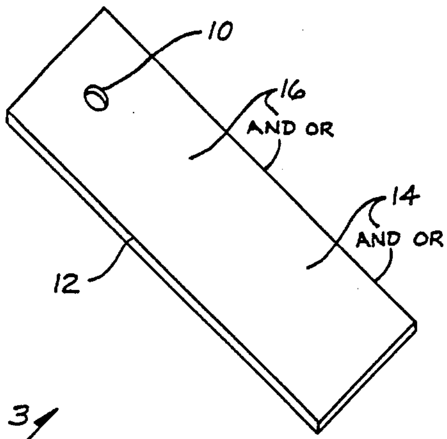
FIG. 1 Shows a perspective view of the invention.
Figure 2:
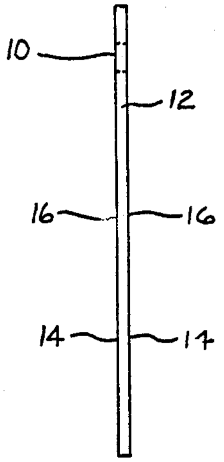
FIG. 2 Shows a side elevation of the invention.
Figure 4:
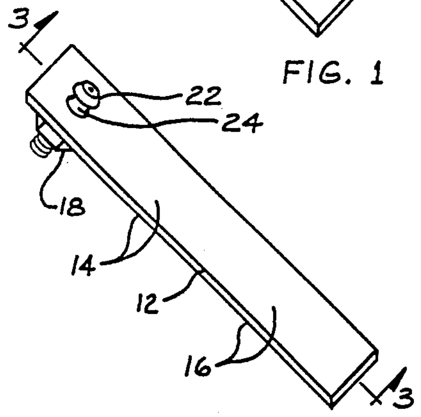

FIG. 4 The device of FIG. 1 mounted on lubricant fitting.

Figure 5:
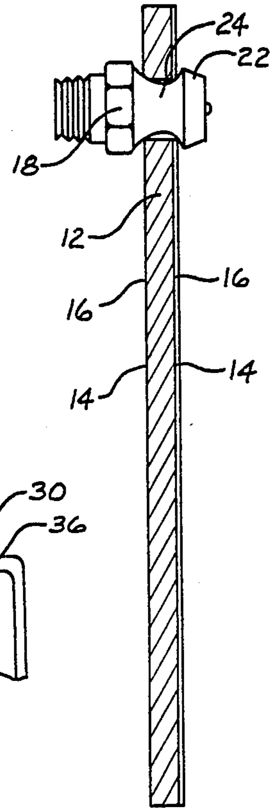

FIG. 5 Is a side sectional view taken at line 3—3 of FIG. 4.

Figure 6:
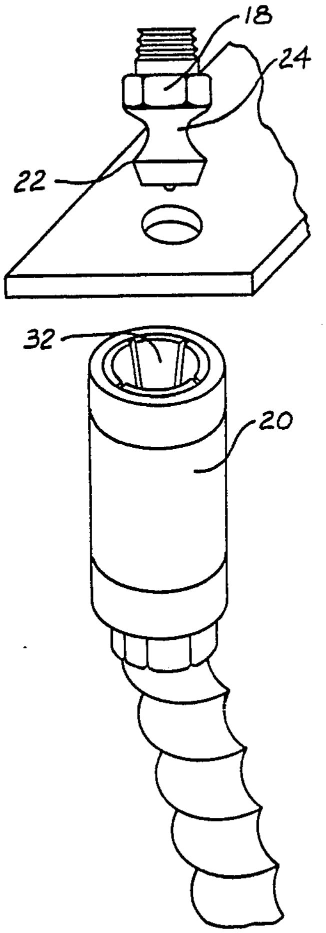

FIG. 6 An exploded view of the service as it is about to be attached to a lubricant fitting neck with the use of a standard grease gun coupler.

Figure 7:
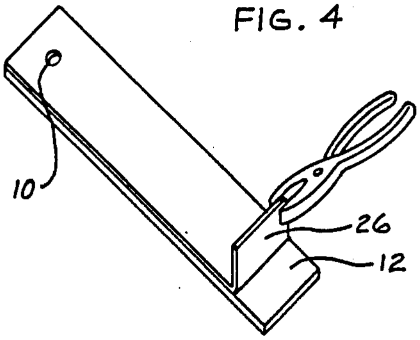

FIG. 7 A perspective view of the device showing the reflective sheeting being lifted from the locator tag's surface for illustration.

Figure 8:
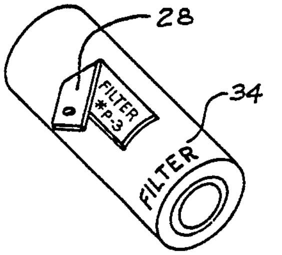

FIG. 8 A perspective view of the device as it is being adhered with an adhesive to a filter element.

Figure 9:
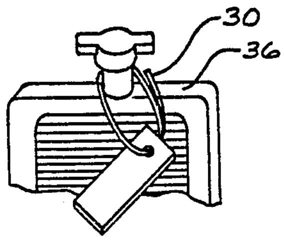

FIG. 9 A perspective view of the device with a nylon tie to be used for its attachment to a radiator.

DRAWING REFERENCE NUMBERS

10 attachment hole
12 locator tag body
14 color indicia coding on surface of body
16 information area
18 lubricant fitting
20 standard grease gun coupler
22 lubricant fitting head
24 lubricant fitting neck
26 reflective sheeting
28 adhesive surface
30 nylon tie, wire, string, or the like
32 retaining fingers
34 filter element
36 radiator

DESCRIPTION OF INVENTION

FIG. 4 Shows an overall view of the invention attached to a lubricant fitting 18. A locator tag body 12 of the invention is of a flat elastic material. Said locator tag size and shape can be determined by the information that needs to be provided on its surface. The locator tag body 12 is provided with an attachment hole 10 that fits over a lubricant fitting head 22, by stretching the material adjacent to said attachment hole 10 over said lubricant fitting head 22 of said lubricant fitting 18. Where the attachment hole 10 comes to rest on a lubricant fitting neck 24, were the locator tag body 12 is retained in this position by the lubricant fitting head 22. FIG. 6 shows a standard grease gun coupler 20 as it is about to be used to accomplish the attachment described above. As the lubricant fitting head 22 contacts the perimeter of the attachment hole 10, said standard grease gun coupler 20 contacts the perimeter of the attachment hole 10 on the opposite side of the locator tag from the lubricant fitting head 22. As a force is applied to the standard grease gun coupler 20 said force is transferred to retaining fingers 32 which grip the material in an adjacent attachment hole 10. Said retaining fingers ride on the surface of lubricant fitting head 22 and assist in guiding the material adjacent attachment hole 10 over the lubricant fitting head 22 and to its attached position on lubricant fitting neck 24.

A color indicia coding 14 may be within the elastic material of the locator tag body 12, or it may be printed or laminated on its surface. FIG. 7 shows a reflective sheeting 26 being lifted from the surface of the locator tag body 12 for illustration purposes only. Said reflective sheeting 26 being a highly visible material commonly used on road signs and licence plate tags, and of the type, but not limited to, that produced by General Electric (FASON TM). This reflective sheeting 26, reflect great amounts of light and are most beneficial when locating service points in dark and dirty areas. Shown in FIG. 1, Color indicia coding 14 may be on one or both sides of locator tag body 12.

Figure 3:
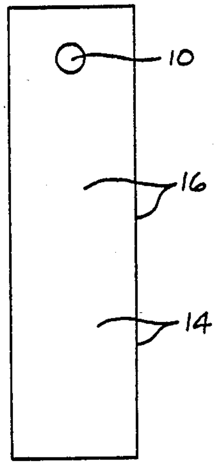
FIG. 3 Shows a front elevation of the invention.

FIG. 3, the information area 16 of the invention is shown. This area is available for information about the service point that the locator tag is attached to and or adjacent to. Again, one or both sides of the locator tag may be utilized. An alternative use for this area is for numbering each tag corresponding to the service point and the numerical order of the service instructions provided for the equipment.

FIG. 8 and FIG. 9 show alternate forms of attachment to things other than lubricant fittings. FIG. 8 shows an adhesive surface 28 being adhered to a filter element 34. FIG. 9 shows a locator tag being attached with a nylon tie 30.

OPERATION OF INVENTION

A preferred method of operation is to install locator tags on all service points of a machine. Different colored locator tags are used to distinguish the maintenance interval. With the tags numbered in the order the service person will at each service interval Complete the service at locator tag number 1 and then number 2 and not number 4 until he has serviced number 3. In this way, there is little chance of over looking any one service point.

CONCLUSION AND SCOPE OF INVENTION

While my above description contains many specifications, these should not be construed as limitations on the scope of the invention, but rather as an exemplification of one preferred embodiment thereof. Those skilled in the art may envision many other possible variations are within scope.

Accordingly the reader is requested to determine the scope of the invention by the appended claims and their legal equivalents, and not by the examples which have been given.

REFERENCES CITED 2,530,888—titled: CAP FOR GREASE FITTINGS, Peter J. Marchelewicz.

2,599,472—titled: PROTECTIVE DEVICE FOR LUBRICANT FITTINGS, Albert E. Miller.

2,680,497—titled: GANG OF GREASE FITTING CAPS, Bernard C. Miller.

3,147,824—titled: HEAT INDICATING PROTECTIVE CAP FOR LUBRICANT FITTINGS, Harold P. Henderson.

4,453,618—titled: GREASE FITTING COVER AND LOCATOR, George Economaki.

I claim:

1. In combination:

a grease fitting head; and a service locator tag attached to the head, the tag comprising:

a flat strip piece of flexible elastic material, an aperture disposed in the piece of material adjacent one end thereof, the aperture being sized so that by stretching the material about the aperture, the fitting head can be received within the aperture and the tag retained in place on the head, and information pertaining to lubrication disposed on the tag.

2. The combination of claim 1, further comprising reflector sheeting attached to the surface of the locator tag for reflecting light.

3. The combination of claim 1 wherein the information disposed on the locator tag comprises color indicia coding.

4. The combination of claim 1 wherein the information disposed on the tag comprises the numerical order for lubrication of the grease fitting head.

5. A method of attaching a service locator tag to a grease fitting having a head and a neck, comprising:

forming a locator tag from a piece of flexible elastic material;

forming an aperture in the piece of material adjacent one end thereof, the aperture being sized so that by stretching the material about the aperture, the head of the grease fitting can be received within the aperture and the tag retained on the neck;

placing the tag adjacent the head of the grease fitting with the axis of the aperture generally coincident with the axis of the fitting and with the head in contact with perimeter of the aperture on one side of the tag;

placing the coupler of a grease gun in contact with the opposite side of the tag with the axis of the coupler generally coincident with the axis of the aperture and with the coupler in contact with the perimeter of the aperture; and pushing the tag with the coupler of the grease gun, whereby the coupler can grip the piece of material and stretch it about the aperture, thereby to guide the material adjacent the aperture over the fitting head and force the tag into its attachment position on the neck of the grease fitting.

* * * * *